Oct. 21, 1969

JAMES E. WEBB
ADMINISTRATOR OF THE NATIONAL AERONAUTICS
AND SPACE ADMINISTRATION
METHOD OF JOINING ALUMINUM TO STAINLESS STEEL
Filed May 17, 1967

INVENTORS
ERNST G. HUSCHKE, JR.
DOUGLAS B. NORD

BY

ATTORNEYS 3,473,216
METHOD OF JOINING ALUMINUM TO
STAINLESS STEEL
James E. Webb, Administrator of the National Aeronautics and Space Administration, with respect to an invention of Douglas B. Nord, Van Nuys, and Ernest G. Huschke, Jr., Canoga Park, Calif.
Filed May 17, 1967, Ser. No. 640,462
Int. Cl. B23k 31/02
U.S. Cl. 29—492                                                8 Claims

ABSTRACT OF THE DISCLOSURE

Aluminum is joined to stainless steel by metallurgically bonding a thin coating of titanium to the joining surface of the stainless steel component, metallurgically bonding a coating of aluminum or aluminum alloy to the titanium coating and brazing or welding the aluminum coating to the aluminum component. The titanium and aluminum coatings, which are applied and bonded to the stainless steel component by a method such as vacuum vapor deposition, prevent the formation of brittle phases in the joint.

---

Figure 1:
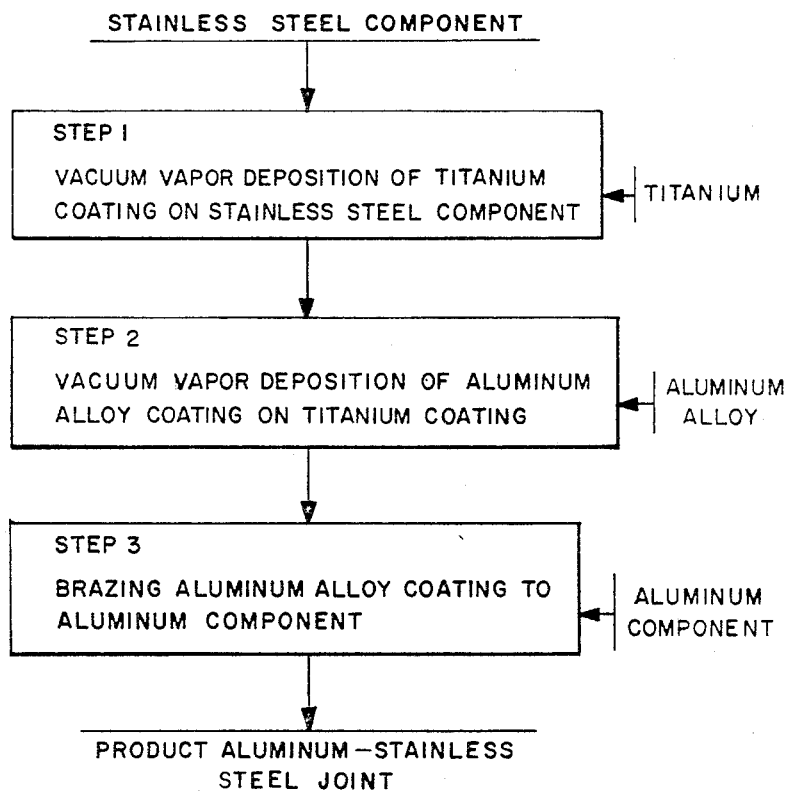

The invention described herein was made in the performance of work under a NASA contract and is subject to the provisions of Section 305 of the National Aeronautics and Space Act of 1958, Public Law 85–568 (72 Stat. 435; 42 U.S.C. 2487).

The invention relates to joining of dissimilar metals and more particularly to a method of joining aluminum to stainless steel.

Joints between aluminum and stainless steel components are required in the fabrication of numerous products which are designed to take advantage of the favorable properties of both of these metals, in particular the light weight and low cost of aluminum and the high strength and superior corrosion resistance of stainless steel. In rocket engine assemblies aluminum-stainless steel joints are required for connection of aluminum valve components to stainless steel tubing and for connection of various other components. Joints for rocket engine applications must be capable of service under severe thermal and mechanical stresses. In addition to high strength and ductility, joints for rocket engine use should exhibit resistance to corrosion, capability for service from liquid hydrogen temperatures up to 1000° F., and absence of degradation in metallurgical structure after thermal cycling.

Various brazing and welding methods have been available for joining aluminum to stainless steel, but the resulting joints are frequently unsuitable for rocket engine applications. For example, brazed joints have been formed by coating the steel component with aluminum or with an intermediate layer of silver and brazing the coated component to the stainless steel article. Such joints are useful at low temperatures and low stresses, but they fail rapidly at higher temperatures or upon undergoing stresses due to thermal cycling or vibration. Failure of these joints normally occurs by cracking resulting from the presence of brittle phases in the joint such as aluminum-iron or aluminum-silver. In order to obtain a joint with the desired mechanical properties the formation of brittle phases or intermetallic compounds must be minimized or eliminated.

It is therefore an object of this invention to provide a method of joining aluminum to stainless steel.

Another object is to provide a method of joining aluminum to stainless steel wherein the formation of brittle phases at the joint is minimized.

Still another object is to provide an aluminum-stainless steel joint suitable for repeated service at high stresses and over a wide range of temperatures.

Yet another object is to provide a method of coating a stainless steel surface so that it can be brazed or welded to aluminum.

Other objects and advantages of the invention will be apparent from the following description taken in conjunction with the accompanying drawings which illustrate embodiments thereof.

Figure 2:
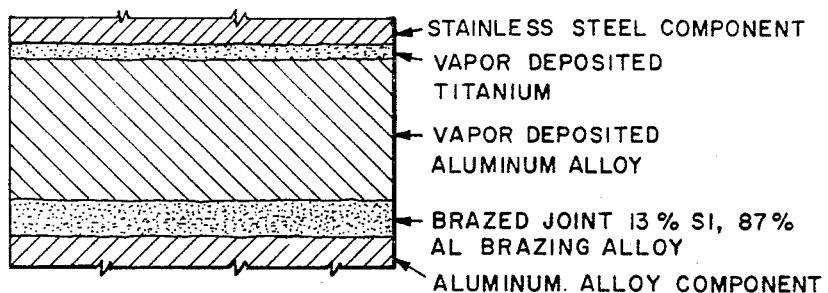

In the drawings:

FIGURE 1 is a flowsheet showing the steps to be performed in carrying out one embodiment of the invention and FIGURE 2 is an enlarged cross section through a brazed joint prepared in accordance with one form of the invention.

In the present invention an aluminum component is joined to a stainless steel component by metallurgically bonding a thin coating of titanium or titanium alloy to the surface of the stainless steel component, metallurgically bonding a coating of aluminum or aluminum alloy on the titanium coating, and brazing or welding the surface of the aluminum coating to the surface of the aluminum component. A strong and ductile metallurgical bond is developed between the aluminum component and the stainless steel component to meet the severe service requirements for rocket engine applications. The formation of embrittling phases or intermetallic compounds at the joint is substantially avoided by use of the deposited titanium and aluminum coatings. No degradation of metallurgical structure or properties occurs in joints formed by this method, even after extended exposure to thermal cycling and severe vibrational stresses.

The term "stainless steel" as used herein is intended to refer to those ferrous metal alloys, containing a substantial amount of chromium or nickel and chromium which are commonly referred to as austenitic, martensitic or ferritic types. Although the present invention is broadly applicable to stainless steels and is not limited to a particular type, it is particularly applicable to stainless steels designated as "304L" (composition in weight percent: nickel, 8 to 12; chromium, 18 to 20; carbon, 0.03 maximum; manganese, 2.00 maximum; phosphorus, 0.045 maximum; sulfur, 0.06, maximum; silicon, 1.00 maximum, and the balance iron and "347" (composition in weight percent: nickel, 9 to 13; chromium 17 to 19; carbon, 0.08 maximum; manganese, 2.00 maximum; phosphorus, 0.045 maximum; sulfur, 0.06 maximum; silicon, 1.00 maximum; columbium plus tantalum equal to 10 times carbon minimum and the balance iron).

The composition of the aluminum component in the present invention can be aluminum or most of the aluminum alloys used as structural materials. For the embodiment wherein brazing is used aluminum and any aluminum alloy having a melting point lower than about 960° F. can be joined by the present method. For joining by welding this method is applicable to aluminum and all aluminum alloys except certain 2000 and 7000 series alloys such as 2024, 2025 and 7075.

The surface of the stainless steel component to be joined is preferbaly cleaned by solvent degreasing prior to applying the titanium coating; however, no passivation or other chemical treatment is required.

A thin coating of titanium or titanium alloy is metallurgically bonded to the stainless steel component at the intended joining surface to serve as a metallurgical barrier to minimize formation of embrittling phases. Although the titanium barrier material can contain minor proportions of alloying elements such as tin, unalloyed titanium is preferred. Commercially pure titanium is suitable for this purpose. A titanium coating thickness from 0.000050 to 0.200 inch can be used, and 0.00065 to 0.001 inch is preferred.

In a preferred embodiment the titanium coating is applied by means of vacuum vapor deposition using previously known techniques. In this method the titanium is placed in a water-cooled crucible, and a vacuum of less than one micron of mercury is established in the crucible chamber. A high-voltage, for example, 10 to 20 kilovolts, electron beam is focused magnetically on the surface of the titanium, and the titanium is vaporized by the intense heat energy. The stainless steel substrate is placed above the titanium in a position such that the vaporized titanium is deposited on the substrate. Prior to vaporizing the titanium, the stainless steel substrate is heated to a temperature of about 1400 to 1500° F. with the electron beam in order to achieve metallurgical bonding between the deposit and the substrate. For deposition on tubular or cylindrical-shaped substrates the stainless steel member is preferably rotated about its axis during deposition of the titaninm to ensure a uniform coating. Vacuum vapor deposition is advantageous in that a high deposition rate and high efficiency are realized. The titanium coating can also be applied by other methods such as chemical vapor deposition or fused salt bath plating.

The titanium-coated stainless steel component is then further coated with aluminum or an aluminum alloy to provide a surface which can be readily brazed or welded to the surface of the aluminum component. The aluminum coating can be unalloyed aluminum or aluminum alloys containing a total of up to 40 weight percent alloying elements such as copper, maganese, silicon and zerconium. Examples of suitable aluminum alloys for coating include those designed at "4043" (composition in weight per cent silicon, 5.5 to 6.0; iron, 0.8 maximum; copper, 0.3 maximum; manganese 0.05 maximum; magnesium, 0.05 maximum; zinc, 0.10 maximum; titanium, 0.2 maximum; others, 0.15 maximum; and the balance aluminum). The aluminum coating is provided at a thickness from 0.001 to 1.0 inch, and preferably from 0.040 to 0.070 inch. An excess thickness can be deposited on the surface and the surface machined off to provide the desired uniform thickness. The aluminum coating is preferably applied by vacuum vapor desposition in the manner described above for the titanium coating, the substrate again being heated to a temperature of 800 to 1100° F. prior to deposition of the aluminum. The aluminum coating can also be applied by dip coating or metal spraying.

The resulting double-coated stainless steel component can be joined to the aluminum component by welding or brazing. Welding can be conducted by fusion of the aluminum coating surface directly to the surface of the aluminum component or by using an aluminum or aluminum alloy filler wire in the manner previously employed for welding aluminum to aluminum. It is preferred to join the aluminum-coated surface to the aluminum component by means of brazing employing an aluminum alloy filler wire. For this method the coated component is preferably machined and positioned to provide an interfacial gap of 0.001 to 0.0015 inch. The filler metal in the form of wire, powder-paste or sheet is placed at the joint and the assembly is heated to brazing temperature. Conventional furnace, induction, molten-salt-bath or torch brazing methods can be used. Molten salt bath with brazing is especially suitable for joining components of valve assemblies. In this procedure the components, with the filler metal preplaced at the joint, are immersed in a bath of a molten chemical salt flux such as chlorides and fluorides of sodium and potassium at a temperature of 960 to 1165° F. The flux dissolves aluminum oxide at the joint interfaces, and the denser brazing alloy replaces the molten salt and dissolved oxide in the joint. Upon removal from the bath the brazing alloy solidifies to form a metallurgical bond.

The composition of the brazing alloy used as a filler metal in this embodiment is not critical, and any of the alloys previously employed for brazing aluminum alloys can be used. A brazing alloy comprising 11 to 13 weight percent silicon and the balance aluminum is preferred to provide a high-strength joint. Other suitable brazing alloys include those having the composition, in weight percent: silicon, 9.3 to 10.7; copper, 3.3 to 4.7 and the balance aluminum.

The invention is further illustrated by the following example.

EXAMPLE

Tubular sections of 347 stainless steel were joined to mating 6061 aluminum valve prototype components by the following procedure. The stainless steel member (outer diameter, 2.25 inches; inner diameter, 2.00 inches and length 1.5 inches) was coated with a 0.00075 inch thick layer of commercially pure titanium. The coating was applied by vacuum vapor deposition, the stainless steel part being preheated to 1450±50° F. and rotated during deposition. A 0.060 inch thick layer of 4043 aluminum was then applied on the titanium coating in the same manner. The coating was then machined to an aluminum thickness of 0.040 inch to fit into the aluminum member with an overlap of 0.0.375±0.010 inch and an interfacial brazing gap of 0.001 to 0.0015 inch. The stainless steel part was then inserted in the aluminum part, and a brazing alloy comprising 87 weight percent aluminum and 13 weight percent silicon was positioned at the interface. The assembly was brazed by immersion in a molten salt bath at a temperature of 1100 to 1115° F. End caps of 6061 aluminum and 304L stainless steel were then welded to the aluminum and stainless steel ends, respectively, in order to test the brazed joint. Pressurized helium was then introduced through an end cap, and the joint was tested for leaks by means of mass spectrometry in the as-fabricated condition and after subjection to thermal cycling and vibration. One specimen showed no increase in helium leakage from an initial value of $1.38 \times 10^{-10}$ cubic centimeters per second after being cycled 100 times from ambient to liquid nitrogen temperature, after being vibrated at resonant frequency and a force of 25 $g$'s for 30 minutes and after heat-treatment at 350° F. for a period of 8 hours. Hydrostatic pressure tests showed a shear strength at the joint of 9600 pounds per square inch. A second specimen also showed no increase in leakage after these tests, and the shear strength at the joint was over 8800 p.s.i., failure occurring at an end cap weldment. Ultrasonic C-scans before and after testing showed essentially complete bonding at the joint, bonding being unaffected by the tests. The joints were sectioned and examined metallographically. FIGURE 2 in the drawing depicts the resulting metallographic section. No evidence of the presence of brittle phases or intermettallic compounds was found.

Although the invention is illustrated specifically for a tube-and-sleeve connection it is to be understood that other shapes and configurations as well as parts of other sizes and thicknesses can be joined by this method.

The above example is merely illustrative and is not to be understood as limiting the socpe of the invention, which is limited only as indicated by the appended claims.

What is claimed is:

1. The method of joining an aluminum component to a stainless steel component which comprises metallurgically bonding a thin, uniform coating of a titanium-base metal on the surface of the stainless steel component at the intended joining surface, metallurgically bonding a coating of an aluminum-base metal on the resulting titanium coating and welding or brazing the resulting aluminum-base metal coating to said aluminum component.

2. The method of claim 1 wherein said titanium-base metal coating and said aluminum base-metal coating are metallurgically bonded by vacuum vapor deposition.

3. The method of claim 1 wherein said titanium-base metal coating is 0.000050 to 0.200 inch thick.

4. The method of claim 3 wherein said aluminum-base metal coating is 0.001 to 1.0 inch thick.

5. The method of claim 4 wherein said aluminum-base metal coating is brazed to said aluminum member with an aluminum brazing alloy.

6. The method of claim 5 where the composition of said brazing alloy is 11 to 13 weight percent silicon and the balance aluminum.

7. The method of claim 5 wherein the configuration of said stainless steel member at the intended joining surface is tubular.

8. The method of claim 5 wherein said stainless steel component is heated to 1400 to 1500° F. prior to deposition of said titanium coating.

References Cited

UNITED STATES PATENTS

| | | | |
|---|---|---|---|
| 3,071,491 | 1/1963 | Horn et al. | 29—198 X |
| 3,105,293 | 10/1963 | Skinner et al. | 29—492 X |
| 3,393,446 | 7/1968 | Hughes et al. | 29—198 X |

JOHN F. CAMPBELL, Primary Examiner

RONALD J. SHORE, Assistant Examiner

U.S. Cl. X.R.

29—197, 198